United States Patent
Yoshino et al.

(10) Patent No.: US 6,906,448 B2
(45) Date of Patent: *Jun. 14, 2005

(54) SYNCHRONOUS INDUCTANCE MOTOR, A MANUFACTURING METHOD OF THE SYNCHRONOUS INDUCTANCE MOTOR, AND A COMPRESSOR

(75) Inventors: Hayato Yoshino, Tokyo (JP); Hitoshi Kawaguchi, Tokyo (JP); Yoshio Takita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 138 days.

This patent is subject to a terminal disclaimer.

(21) Appl. No.: 10/290,349

(22) Filed: Nov. 8, 2002

(65) Prior Publication Data

US 2003/0090170 A1 May 15, 2003

(30) Foreign Application Priority Data

Nov. 12, 2001 (JP) ........................................ 2001-346149

(51) Int. Cl.⁷ ........................... H02K 1/27; H02K 21/14; H02K 19/14
(52) U.S. Cl. ....................................... 310/216; 310/212
(58) Field of Search .............................. 310/216, 211, 310/91, 212, 156.47

(56) References Cited

U.S. PATENT DOCUMENTS

| | | | | |
|---|---|---|---|---|
| 2,483,848 A | * | 10/1949 | Saretzky | 310/162 |
| 2,975,310 A | * | 3/1961 | Armstrong et al. | 310/163 |
| 3,629,628 A | * | 12/1971 | Rank et al. | 310/54 |
| 4,064,410 A | * | 12/1977 | Roach | 310/211 |
| 5,831,367 A | * | 11/1998 | Fei et al. | 310/217 |

FOREIGN PATENT DOCUMENTS

| | | |
|---|---|---|
| JP | 63-217957 | 9/1988 |
| JP | 5-316701 | 11/1993 |
| JP | 10-127023 | 5/1998 |
| JP | 2001-73948 | 3/2001 |
| JP | 2001-186735 | 7/2001 |

* cited by examiner

*Primary Examiner*—Tran Nguyen
(74) *Attorney, Agent, or Firm*—Oblon, Spivak, McClelland, Maier & Neustadt, P.C.

(57) ABSTRACT

A synchronous inductance motor provided in a rotor includes at least a pair of slit portions forming a two-pole magnetic polar projection having an easy-to-pass direction of the magnetic flux, i.e., q-axis and a difficult-to-pass direction of the magnetic flux, i.e, d-axis which are almost orthogonal and a plurality of slot portions close to an outer circumference in the slit portions and connected to at least an end of the slit portion in a direction of the d-axis for generating inductance torque. Further, conductivity material is filled in the slit portions and the slot portions.

8 Claims, 18 Drawing Sheets

SYNCHRONOUS INDUCTANCE MOTOR, A MANUFACTURING METHOD OF THE SYNCHRONOUS INDUCTANCE MOTOR, AND A COMPRESSOR

BACKGROUND OF THE INVENTION

1. Field of the Invention

This invention relates to a synchronous inductance motor which starts using inductance torque and performs a synchronous operation using reluctance torque and its manufacturing method.

2. Description of the Related Art

FIG. 16 illustrates a sectional view of a motor according to the related art disclosed in Japanese Unexamined Patent Publication HEI 10-127023. In FIG. 16, a rotor 11, a slit 13, and a stator 20 are illustrated.

In FIG. 16, since a multiplicity of slits 13 in a linear shape is provided in the rotor 11, a d-axis which is an easy-to-pass direction of magnetic flux and a q-axis which is a difficult-to-pass direction of magnetic flux are shifted by 90 degrees each other, and the motor includes a two-pole magnetic polar projection. The slit 13 does not include a conductivity member (secondary conductor), and the slit 13 includes an air layer.

FIG. 17 illustrates a sectional view of a rotor of a synchronous motor packaged in a compressor according to the related art disclosed in Japanese Unexamined Patent Publication 2001-73948. In FIG. 17, a rotor 105, slots 301 and 304 filled with aluminum, and permanent magnets 300a and 300b are illustrated. In FIG. 17, a two-pole rotor includes the permanent magnets 300a and 300b arranged so that S pole, S pole, N pole, and N pole are arranged in a circumference direction of the rotor 105.

The motor according to the related art is structured as stated, and there are following problems. Since an inside of the slit 13 in the motor illustrated in FIG. 16 is not filled with the conductivity member, the rotor 11 does not have a secondary conductor in a squirrel-cage shape. Therefore, it is necessary that the stator generates a magnetic field appropriate for a position of the rotor 11, and it becomes necessary to use a mechanism for detecting a rotor position and a drive circuit. When the mechanism for detecting the rotor position is provided, a cost of the motor goes up, and a size of the motor becomes larger. Further, since the drive circuit is used, a system for driving the motor becomes large-scale, and an expensive control device becomes necessary. Hence, a cost goes up.

Further, if the position of the rotor is not detected accurately, it is impossible to stably perform the synchronous operation. Therefore, there is a problem that the cost further goes up. As explained with reference to FIG. 17, in the synchronous motor packaged in the compressor according to the related art, the slots 301 and 304 are filled with aluminum and the rotor 105 includes the secondary conductor in the squirrel-cage shape. Hence, the motor can start easily. However, since the synchronous operation is performed using the permanent magnets 300a and 300b which are expensive, there is a problem that the cost of the motor and the cost of the compressor tend to go up. Further, since the rotor 105 includes the permanent magnets 300a and 300b, when the synchronous motor is dismantled, the permanent magnets attract a dismantling device, and a dismantling operation becomes difficult.

SUMMARY OF THE INVENTION

This invention is intended to obtain a synchronous inductance motor in a low price, which can start easily, an apparatus for manufacturing the synchronous inductance motor, and a manufacturing method of the synchronous inductance motor. Further, this invention is intended to obtain the reliable synchronous inductance motor, the apparatus for manufacturing the synchronous inductance motor, and the manufacturing method of the synchronous inductance motor. Further, this invention is intended to provide the synchronous inductance motor which can be recycled and dismantled easily, the apparatus for manufacturing the synchronous inductance motor, and the manufacturing method of the synchronous inductance motor.

According to an aspect of this invention, a synchronous inductance motor includes at least a pair of slit portions provided in a rotor, for forming two-pole magnetic polar projection having an easy-to-pass direction of the magnetic flux, i.e., d-axis and a difficult-to-pass direction of the magnetic flux, i.e., q-axis which are almost orthogonal, and a plurality of slot portions arranged close to an outer circumference in the slit portions and connected to at least an end of the slit portions in a direction of the d-axis, for generating induction torque. Further, the slit portions and the slot portion are filled with conductivity material.

According to another aspect of this invention, a manufacturing method of a synchronous inductance motor which has a rotor iron core includes non-adjacent slit-slot punching for punching non-adjacent slit-slots among a plurality of slit-slots including a slot portion for generating inductance torque and a slit portion for generating reluctance torque connected each other, adjacent slit-slot punching for punching a slit-slot existing between the non-adjacent slit-slots punched in the non-adjacent slit-slot punching, and rotor outer circumference punching for punching an outer circumference of the rotor iron core.

Further features and applications of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Other objects features, and advantages of the invention will be apparent from the following description when taken in conjunction with the accompany drawings.

DETAILED DESCRIPTION OF THE PREFERRED EMBODIMENTS

Embodiment 1

Figure 1:
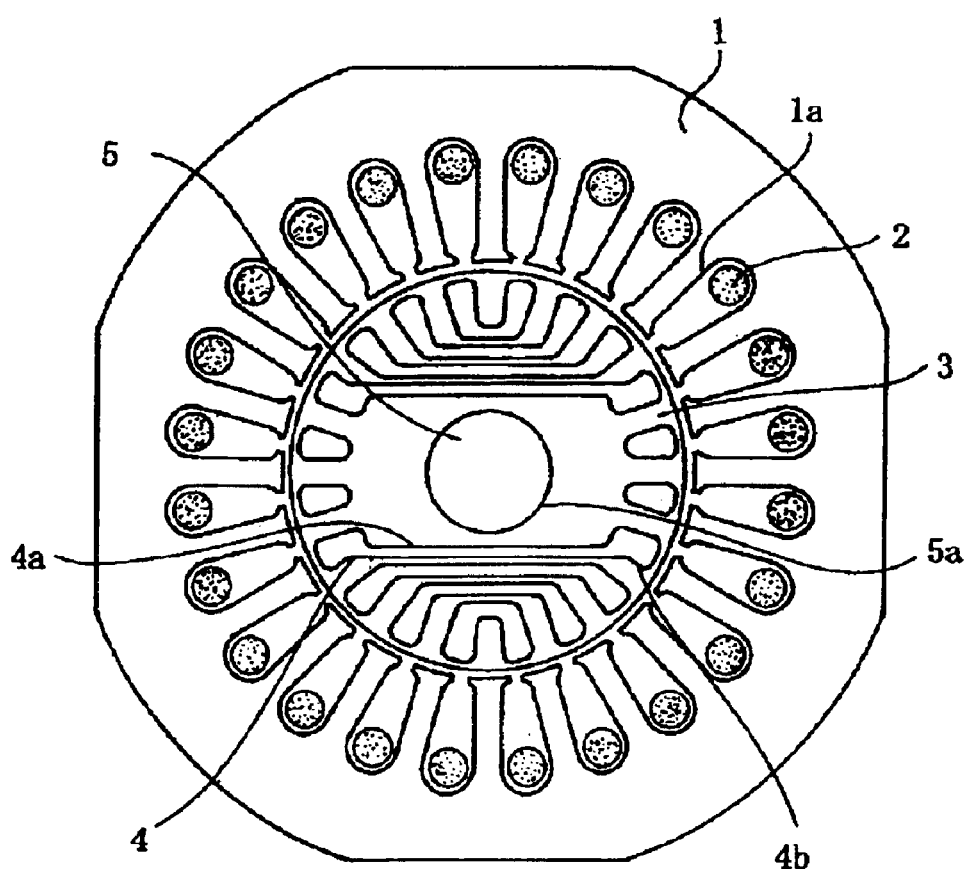
FIG. 1 shows a cross-sectional view of a synchronous inductance motor in Embodiment 1 of this invention.
Figure 2:
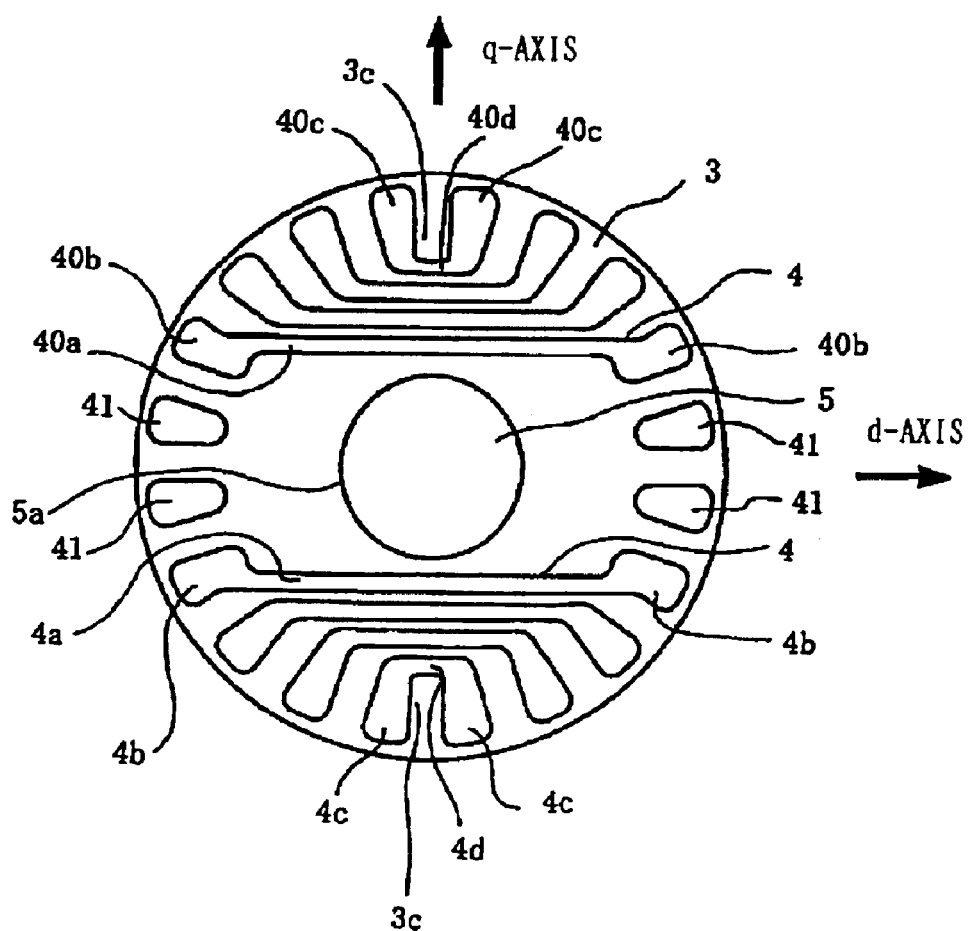
FIG. 2 shows a sectional view of a rotor in Embodiment 1 of this invention.
Figure 3:
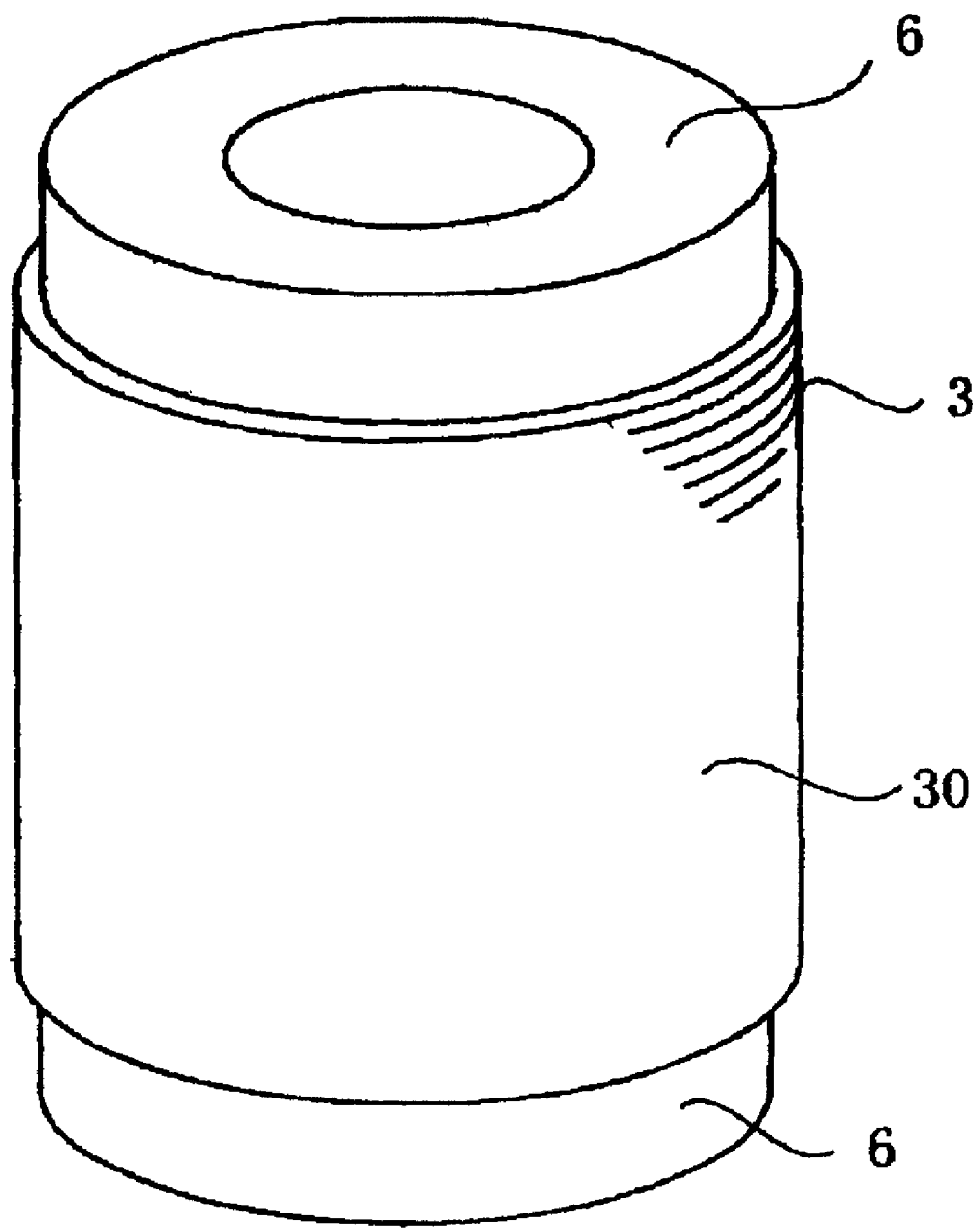
FIG. 3 shows a perspective view of the rotor in the synchronous inductance motor in Embodiment 1 of this invention.

With reference to drawings, Embodiment 1 of this invention is explained. FIG. 1 shows a cross-sectional view of a synchronous inductance motor in Embodiment 1 of this invention. FIG. 2 shows a sectional view of a rotor in Embodiment 1 of this invention. FIG. 3 shows a perspective view of the rotor of the synchronous inductance motor in Embodiment 1 of this invention. In FIG. 1, a stator iron core 1 includes an electromagnetic steel plate which is a magnetic portion. A plurality of electromagnetic steel plates is layered to constitute a stator.

Further, a coil 2 is wound in an inside of a slot portion 1a of the stator iron core 1, and a rotor iron core 3 includes an electromagnetic steel plate which is a magnetic portion. A plurality of electromagnetic steel plates is layered to constitute a rotor 30 illustrated in FIG. 3. A pair of slit-slots 4 includes slit portions (4a, 40a, etc.) and slot portions (4b, 4c, 40b, 40c, etc.), and of which insides are filled with conductivity members made of aluminum material. A shaft 5 is fixed to the rotor 30 using press fits, shrink fits, etc. into a through-hole 5a for the shaft provided at a center of the rotor iron core 3.

In FIG. 2, the plurality of slot portions 4b, 4c, 40b, 40c, 41, etc. in the slit-slots 4 are arranged radially with respect to the center of the rotor iron core 3 and almost evenly. The plurality of slot portions generates inductance torque. The slot portions 4b and 4b arranged radially are connected linearly and continuously to be almost parallel to the d-axis by the slit portion 4a. The slot portions 40b and 40b are connected linearly and continuously to be almost parallel to the d-axis by the slit portion 40a. Therefore, the d-axis which is the easy-to-pass direction of the magnetic flux and the q-axis which is the difficult-to-pass direction of the magnetic flux can be obtained. The slit portion 4a is provided so that the d-axis and the q-axis cross almost at the center of the rotor and the d-axis and the q-axis are orthogonal, and a two-pole magnetic polar projection is formed. Specifically, the slot portions are connected to both ends of the slit portion in a longitudinal direction (direction of the d-axis).

In the slit-slots 4, the slit portions 4a and 40a are provided. The slit portion 4a and the slit portion 40a in a linear shape are arranged in both sides of the d-axis at equidistant positions from the d-axis which passes almost the center of the rotor iron core 3. The slit portion 4a and the slit portion 40a are provided in a pair so that the slit portion 4a and the slit portion 40a are almost parallel. In FIG. 2, the easy-to-pass direction of the magnetic flux is illustrated as the d-axis and the difficult-to-pass direction of the magnetic flux is illustrated as the q-axis. The slot portions 4c and 4c in the direction of the q-axis are connected by a slit portion 4d which is almost parallel to the q-axis. The slot portions 4c and 4c and a slit portion 4d form a "U" shape.

Therefore, after the rotor iron core 3 is punched, a projection portion 3c of the rotor iron core 3, projecting toward a center direction, is formed in the slot portions 4c and 4c in the direction of the q-axis and the slit portion 4d. (Similarly, the projection portion 3c of the rotor iron core 3, projecting toward the center direction, is formed in the slot portions 40c and 40c in the direction of the q-axis and a slit portion 40d.)

In FIG. 3, the rotor 30 is illustrated. At both ends of the rotor iron core 3 layered, end-rings 6 which are conductivity members made of the aluminum material are provided by die-casting aluminum. A secondary conductor in the squirrel-cage shape is formed out of the aluminum material which is filled in the inside of the slot portions 4b of the slit-slot 4 of the rotor 30 and end-rings 6 provided at the both ends of the rotor iron core 3 layered. When the current flows into the secondary conductor, the inductance torque is generated, and the motor is started.

Specifically, a conductivity member made of non-magnetic material, e.g., the aluminum material, etc. is filled in the slot portion, and secondary current flows into the slot portion for generating the inductance torque at starting time and during asynchronous operation. Like in the slot portion, the conductivity member made of the non-magnetic material, e.g., aluminum material, etc. is filled in the slit portion. In this embodiment, the slot portion and the slit portion are connected and integrated, and the slit-slot is formed by punching the slot portion and the slit portion.

The aluminum material filled in the slit-slot 4 of the rotor 30 is the non-magnetic material. Further, since the slit-slot 4 has directionality (the easy-to-pass direction of the magnetic flux (d-axis) and the difficult-to-pass direction of the magnetic flux (q-axis) are shifted by a mechanical angle of 90 degrees each other), the magnetic flux created in the stator iron core 1 includes the two-pole magnetic polar projection depending on a position of the rotor.

In this embodiment, the d-axis and the q-axis are shifted by the mechanical angle of 90 degrees each other, and the synchronous inductance motor with two-poles is constituted. Since the slot portions 4b and 40b are provided, even if the synchronous inductance motor is operated by connecting the coil 2 of the stator iron core 1 to commercial electric power source in 50 Hz or 60 Hz, a special starting device is not necessary for starting, and a motor at a low cost can be realized. Further, since the slit portions 4a and 40a are provided to include the two-pole magnetic polar projection, the synchronous operation is possible. Further, a rotation number at a time of operation can be increased up to a synchronous rotation number of 3000 (rpm) or 3600 (rpm) as no slip factor exists like in the inductance motor.

Since a number of poles is two, it is possible to increase the rotation number compared with the rotation number in a case when the number of the poles is four. Specifically, in a structure with four poles, when commercial electric power source in 50 Hz and 60 Hz is used, the rotation number can be increased only to 1500 (rpm) and 1800 (rpm) which is half of the rotation number in a case of two poles even in a synchronous operation. However, in a structure of two poles in this embodiment, it is possible to increase the rotation number up to 3000 (rpm) and 3600 (rpm). Accordingly, it is possible to increase the rotation number of the motor and realize a motor with high output power.

The rotor of the synchronous inductance motor according to this invention can be manufactured by die-casting aluminum as the inductance motor according to the related art is manufactured. Therefore, a cost of manufacturing the synchronous inductance motor according to this embodiment does not go up compared with a cost of manufacturing the inductance motor according to the related art.

Further, since the slot portions 4b and 40b are placed radially at almost equal intervals on an outer circumference of the rotor 3, it is possible to increase the inductance torque. Therefore, the motor can start stably and reach the synchronous operation. Hence, it is possible to realize the reliable synchronous inductance motor.

As stated, the rotor includes the plurality of slot portions arranged close to the outer circumference for generating the inductance torque, and a pair of slit portions connecting the plurality of slot portions so that the d-axis which is the easy-to-pass direction of the magnetic flux and the q-axis which is the difficult-to-pass direction of the magnetic flux exist. Further, since the two-pole magnetic polar projection is formed in the rotor by filling the inside of the slot portion and the inside of the slit portion with the aluminum material which is conductivity material, the synchronous motor which can start without using a special starting device can be realized at a low cost. Further, since the two-pole magnetic polar projection is included, the synchronous operation is possible, and the rotation number at the time of operation can be the synchronous rotation number as the slip factor does not exist like in the inductance motor.

Further, since the pair of slit portions is almost in the linear shape, the magnetic flux can pass through the slit portions easily, and an efficient motor can be realized. Further, since the pair of slit portions is almost parallel to the d-axis which is the easy-to-pass direction of the magnetic flux, the magnetic flux can pass through the slit portions easily. Further, it is possible to suppress a rise in temperature of the motor, and the reliable motor without an incidence like burning the coil, etc. can be realized.

Figure 4:
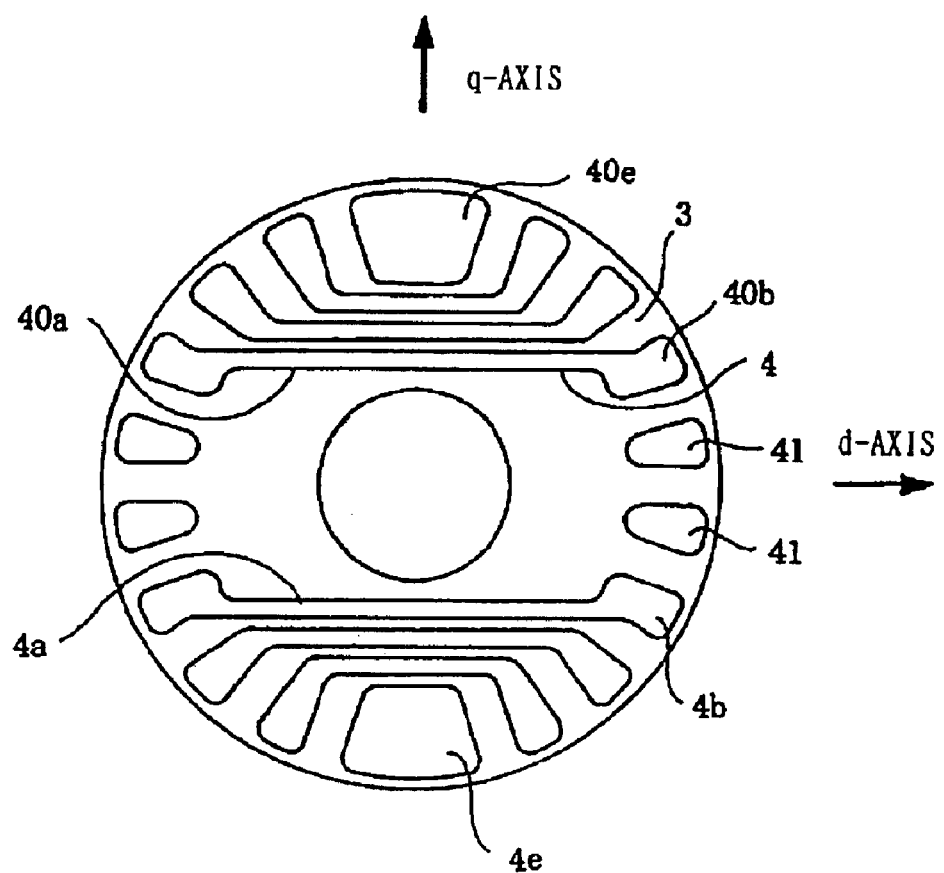
FIG. 4 shows a sectional view of another rotor in the synchronous inductance motor in Embodiment 1 of this invention.
Figure 5:
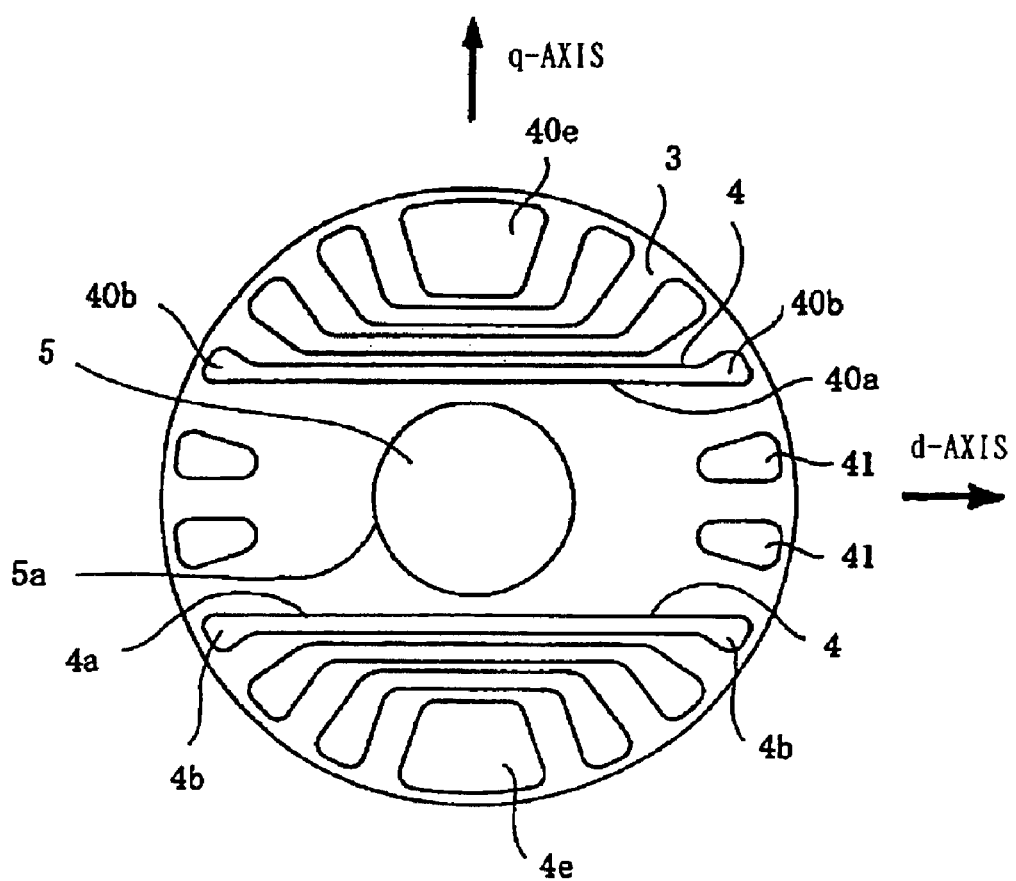
FIG. 5 shows a sectional view of another rotor in the synchronous inductance motor in Embodiment 1 of this invention.

FIGS. 4 and 5 show sectional views of another rotor in the synchronous inductance motor in Embodiment 1 of this invention. For the portions equivalent to the portions in FIGS. 1–3, same signs are used, and explanations are omitted. In FIGS. 4 and 5, the slot portions 4c and 4c in the direction of the q-axis illustrated in FIG. 2 and the slit portion 4d connecting the slot portions (slot portions 40c and 40c and the slit portion 40d connecting the slot portions 40c) are integrated into a slit-slot 4e (40e).

By integrating them, it is possible to punch the slot portions 4c and 4c in the direction of the q-axis and the slit portion 4d (slot portions 40c and 40c and the slit portion 40d) as a single slot portion. Therefore, a structure of a blade for punching becomes simple, and a punching device can be obtained at a low cost. Further, in a case illustrated in FIG. 2, the slot portions 4c and 4c and the slit portion 4d form a U-shape, and there is a possibility that the projection portion 3c projecting toward the center is twisted after punching and the accuracy in punching the rotor iron core 3 drops. However, when the slot portions 4c and 4c in the direction of the q-axis and the slit portion 4d (slot portions 40c and 40c and the slit portion 40d) are integrated into a single slot portion as illustrated in FIG. 4, there is no projection portion 3c. Hence, the accuracy in punching the rotor iron core 3 can be improved.

Since the slot portions are placed radially and almost evenly in the rotor 30 of the synchronous inductance motor of FIG. 2 and FIG. 4, it is possible to start the motor stably like the inductance motor. Further, since the slot portions in the direction of the q-axis and the slit portion are integrated into a slot portion as illustrated in FIG. 4, characteristics on entering the synchronous operation after starting the motor is improved, and it becomes possible to operate stably at the synchronous rotation number. Hence, the efficient motor can be realized. Further, since the characteristics on entering the synchronous operation is improved, it is possible to suppress vibrations and noise caused by the torque during asynchronous operation.

Figure 6:
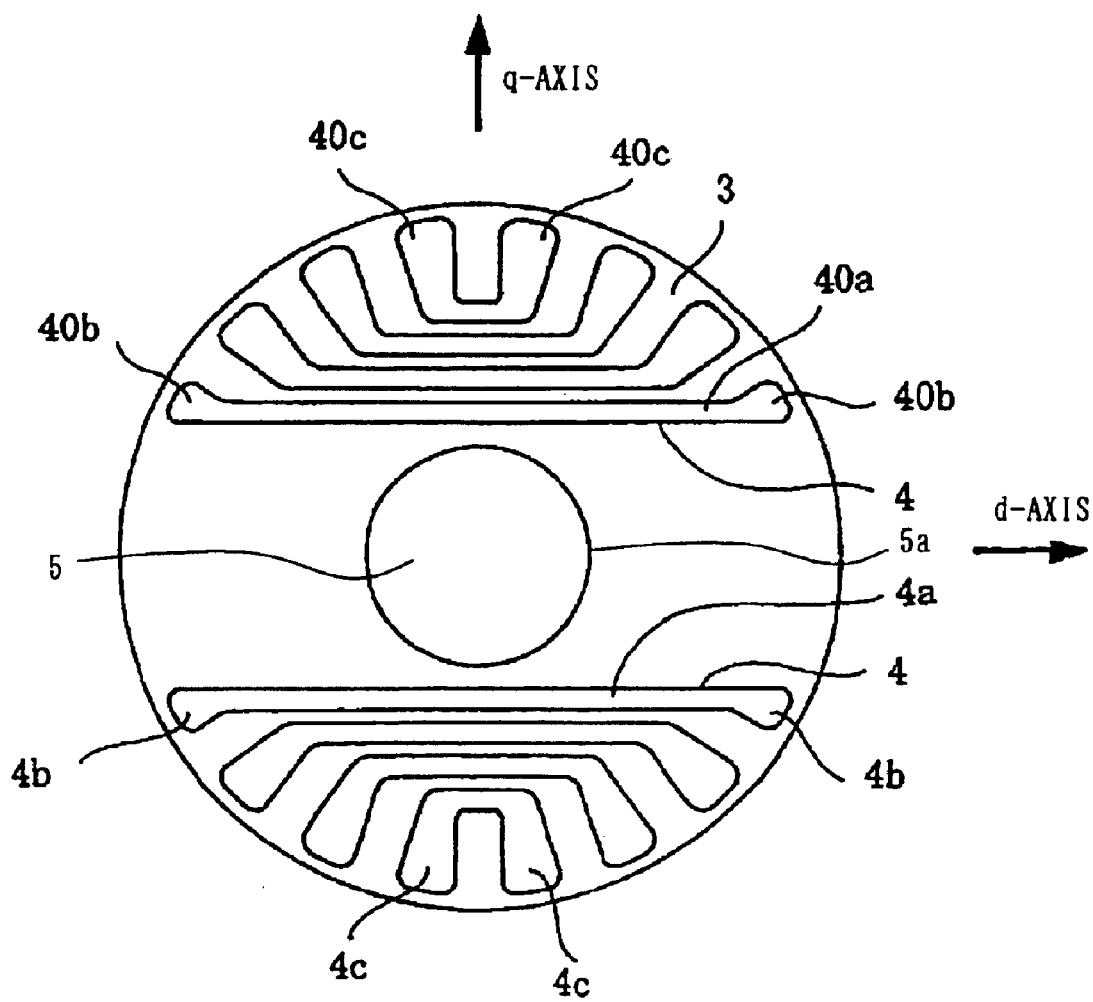
FIG. 6 shows a sectional view of another rotor in Embodiment 1 of this invention.
Figure 7:
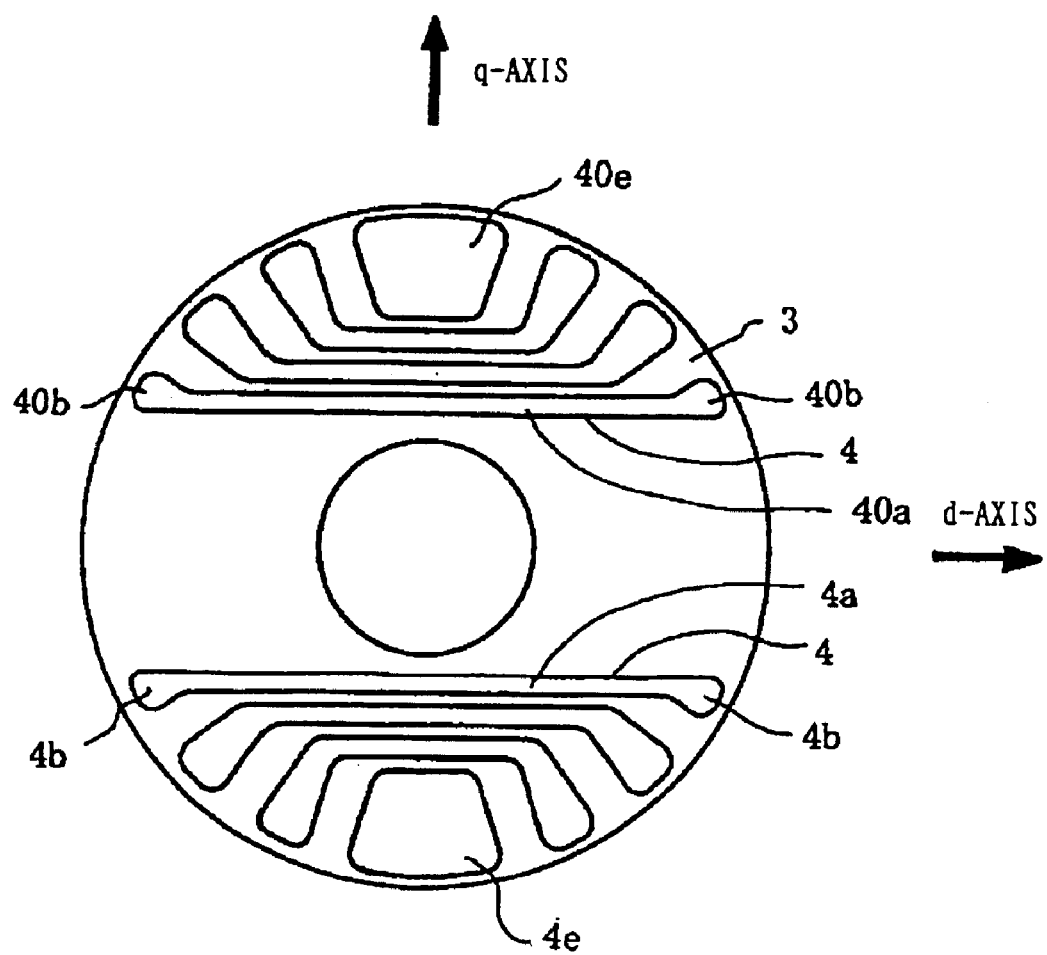
FIG. 7 shows a sectional view of another rotor in Embodiment 1 of this invention.

FIGS. 6 and 7 show sectional views of another rotor of this embodiment. In FIGS. 6 and 7, same signs are used for the portions equivalent to the portions in FIG. 2, FIG. 4 and FIG. 5, and explanations are omitted. The slot portion 41 in the direction of the d-axis illustrated in FIG. 2 is omitted in the rotor illustrated in FIGS. 6 and 7. Further, insides of the slot portions 4b and 40b in the slit-slot 4 provided in the most inner position among pairs of slit-slots which are almost parallel to the d-axis project inward than extended lines of the pair of slit portions 4a and 40a in the linear shape which are almost parallel so that the magnetic flux can easily pass in the direction of the d-axis. Accordingly, magnetic resistance in the direction of the d-axis is reduced.

Specifically, since the slot portion is not provided within a range of an area where straight lines which are parallel to the d-axis meet or touch the through-hole 5a for a shaft of the rotor iron core 3 (the slot portion 41 illustrated in FIG. 2, FIG. 4 and FIG. 5 is not provided), the magnetic flux can pass easily in the direction of the d-axis, and the magnetic resistance in the direction of the d-axis is reduced. Further, since the slit portion is not provided within the range of the area where the straight lines which are parallel to the d-axis meet or touch the through-hole 5a for the shaft of the rotor iron core 3 and the slot portions 4b and 40b of the slit-slot 4 which is provided in the most inner position do not project toward a direction of the through-hole 5a of the shaft than the slit portions 4a and 40a, the magnetic flux can pass easily in the direction of the d-axis, and the magnetic resistance in the direction of the d-axis is reduced.

The synchronous motor can generate larger reluctance torque when a difference between inductance Lq of a stator coil measured from a direction of the q-axis and inductance Ld of a stator coil measured from a direction of the d-axis is larger. Therefore, when the slot portion 41 in the direction of the d-axis is omitted and slot portions of two slit-slots 4 provided in the most inner position among the slit-slots do not project to an inside of the slit portion as in this embodiment, magnetic resistance in the direction of the d-axis is reduced. Accordingly, large reluctance torque can be generated, and it is possible to realize the synchronous inductance motor with high output power. The slot portion 41 in the direction of the d-axis is omitted. However, remaining slot portions are placed radially also in this case. Therefore, a separate starting device, etc. is not necessary. Accordingly, the reliable synchronous inductance motor of which starting performance is sufficient can be realized at a low cost.

Figure 18:
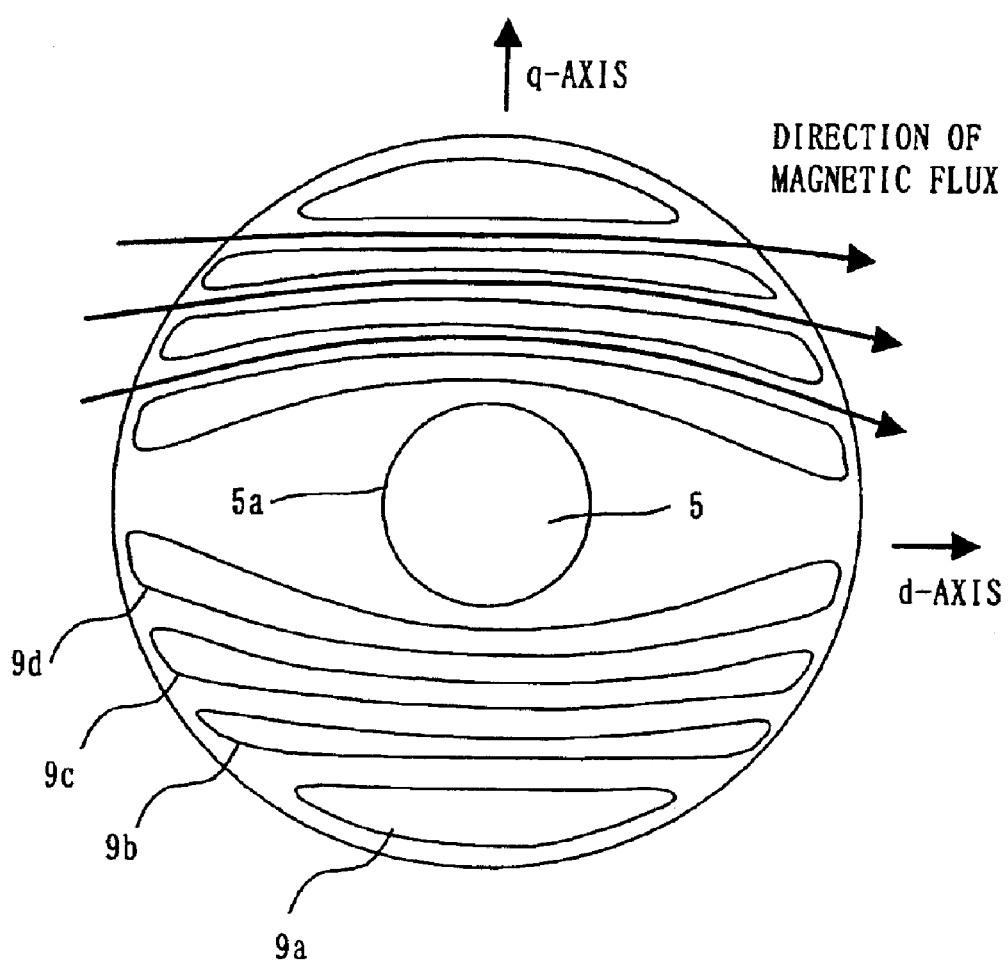
FIG. 18 shows a sectional view of another rotor in Embodiment 1 of this invention.

FIG. 18 shows a sectional view of another rotor of this embodiment. In FIG. 18, same signs are used for the portions equivalent to the portions in FIG. 2, FIGS. 4–7, and explanations are omitted. In the rotor illustrated in FIG. 18, slits 9a–9d are provided so that the magnetic flux can pass easily in an area which is separate from the d-axis in vertical directions in FIG. 18 like the magnetic flux passing on the d-axis.

Accordingly, it becomes possible to further reduce the magnetic resistance and generate large reluctance torque. Consequently, the efficient synchronous inductance motor with high output power can be realized.

Figure 8:
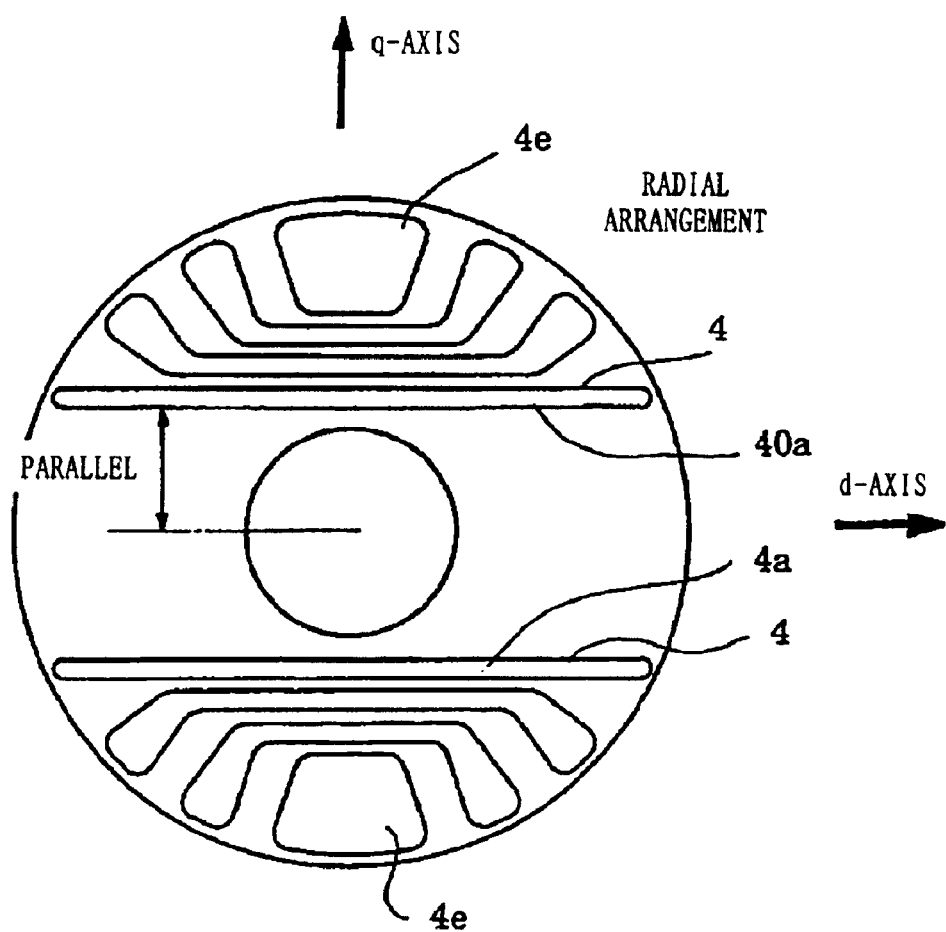
FIG. 8 shows a sectional view of another rotor in Embodiment 1 of this invention.

FIG. 8 shows a sectional view of another rotor of this embodiment. In FIG. 8, same signs are used for the portions equivalent to the portions in FIG. 2, FIGS. 4–7, and explanations are omitted. In the rotor illustrated in FIG. 8, portions corresponding to the slot portions 4b and 40b of the slit-slot 4 provided in the most inner position among pairs of slit-slots which are almost parallel to the d-axis of the rotor are omitted, and the slit portions 4a and 40a are extended to positions of the slot portions 4b and 40b linearly.

Accordingly, since there is no slot portion of the slit-slot 4 provided in the most inner position, the aluminum material used for filling is less. Hence, the motor can be realized at a low cost. Further, since a shape of the slit-slot becomes simple, a die for punching can be simplified, and the cost can be reduced. Further, passage of the magnetic flux created at the stator can be improved, and the motor can be operated efficiently. Particularly, a shape of the slit-slot 4 which is closest to the shaft 5 is almost parallel to the d-axis, the passage of the magnetic flux can be further improved, and the efficient motor can be realized. Therefore, the rise in temperature due to loss in the motor can be reduced, and the efficiency of the motor can be improved. Remaining slot portions are placed radially also in this case. Therefore, the separate starting device, etc. is not necessary, and starting performance is sufficient.

Figure 9:
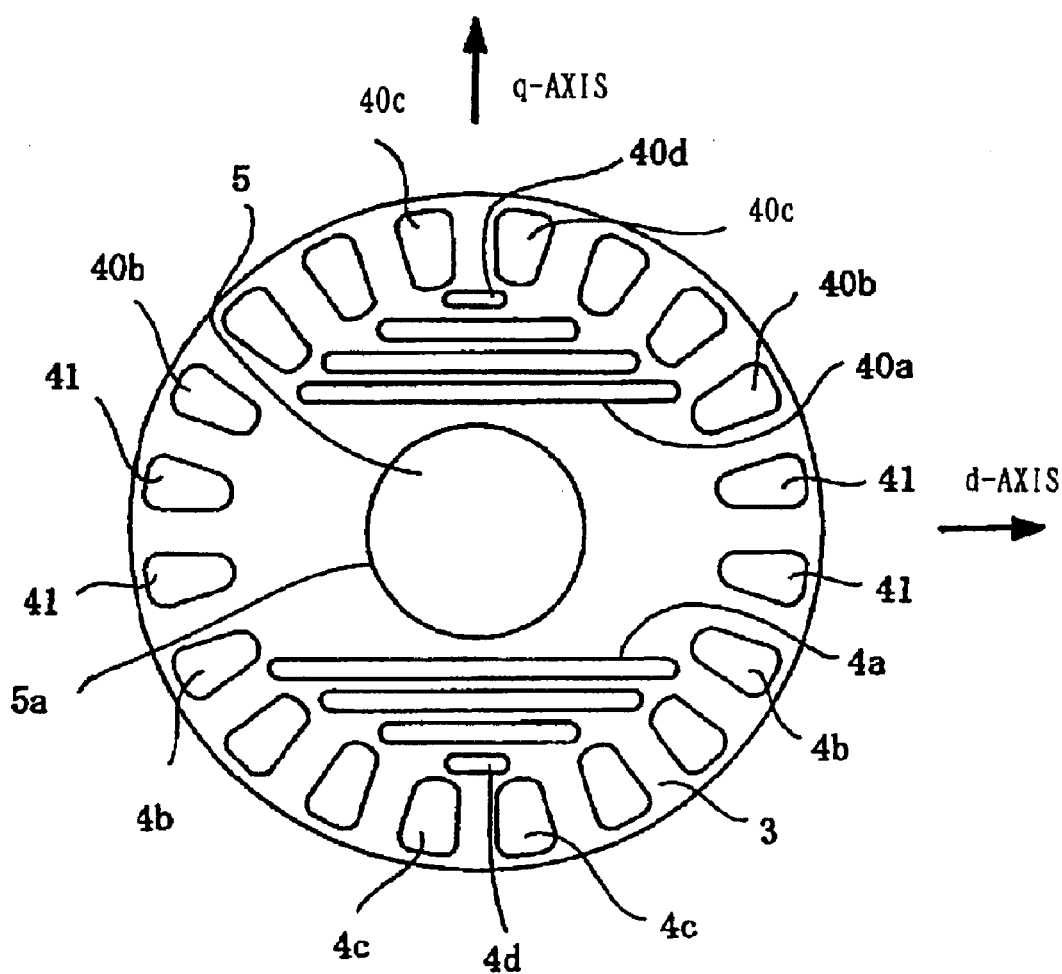
FIG. 9 shows a sectional view of another rotor in Embodiment 1 of this invention.

It is also possible to separate the slit portions (4a, 4d, 40a, 40d, etc.) and the slot portions (4b, 4c, 40c, 40d, etc.) in the slit-slot. FIG. 9 shows a sectional view of another rotor of this embodiment. In FIG. 9, same signs are used for the portions equivalent to the portions in FIG. 2, FIGS. 4–8, and explanations are omitted. In the rotor illustrated in FIG. 9, the slit portions (4a, 4d, 40a, 40d, etc.) and the slot portions (4b, 4c, 40c, 40d, etc.) in the slit-slot in FIG. 2 are separated.

In FIG. 9, the slit portions 4a, 4d, 40a, and 40d are arranged to obtain the d-axis which is the easy-to-pass direction of the magnetic flux and the q-axis which is the difficult-to-pass direction of the magnetic flux, and the reluctance torque is generated. The slot portions 4b, 4c, 40b, 40c, and 41 are arranged radially with respect to the center of the rotor iron core 3 and almost evenly, and the inductance torque is generated.

The slit portion 4a and the slot portion 4b are separated, and the slit portion 40a and the slot portion 40b are separated. The slit portion 4d and the slot portion 4c are separated, and the slit portion 40d and the slot portion 40c are separated.

By separating the slit portion and the slot portion, it becomes possible to fill the slit portion and the slot portion with respective members. For example, the slot portion can be filled with the aluminum material by die-casting, etc., and the slit portion can be filled with another member, e.g., copper, etc. by die-casting, etc. In this case, the member filled in the slit portion and the member filled in the slot portion can be separated by filling the slot portion with the member which is different from the member filled in the slit portion after covering the slit portion for preventing the member filled in the slot portion from flowing into the slit portion.

As stated, since the slit portion and the slot portion are separated, respective members can be filled in the slit portion and the slot portion. Therefore, the member for filling can be selected more flexibly, and the cost can be reduced. Further, it is possible to increase flexibility in characteristics of the motor.

It is not necessary the slit portion is filled with the conductivity member. It is possible to fill the slot portion with the conductivity member and fill the slit portion with a low permeability member. A similar effect can be realized by inserting a magnet with the low magnetic passing rate into the slit portion. In this case, an opening in a size of the magnet is provided in the member filled for inserting the magnet, and the magnet is inserted to the opening. In this case, the slit portion includes a fitting portion which is in a shape of a concave or a convex, and the magnet fitted into the fitting portion is in a shape of a concave or a convex so that the magnet and the slit portion are fitted each other. When the magnet is inserted so that the magnet is fitted into the slit portion, it becomes easy to determine an insertion position of the magnet, further the magnet can be fixed surely.

As a method for forming the secondary conductor in the squirrel-cage shape, there is a method for inserting an aluminum bar which is processed in a shape of the slit-slot 4 to each of the slit-slots 4 and welding a processed end-ring to the aluminum bar inserted to the slit-slot 4. However, since it is necessary to process the aluminum bar to form a slit in a complex shape, a cost goes up slightly.

As another method for forming the secondary conductor in the squirrel-cage shape, there is a method for providing the aluminum material in an inside of the slit-slot to be integrated with the end-rings by die-casting aluminum. When the rotor 30 is manufactured in this method, the aluminum material filled in the slit-slot 4 and the end-rings 6 provided at both ends of the rotor 30 are formed to be integrated by die-casting. Hence, the efficiency in manufacturing is improved, and time for manufacturing can be reduced.

When the end-rings and the aluminum material in the slit-slot 4 are fixed each other by welding, the rotor iron core 3 and the secondary conductor in the squirrel-cage shape become less integrated depending on a method for welding, a position welded, etc. Since it is impossible to maintain the strength against centrifugal force, there is a possibility that the rotor 30 is damaged during operation. However, by integrating the end-rings with the aluminum material in the slit-slot 4 by die-casting, the rotor iron core 3 and the secondary conductor (aluminum material) in the squirrel-cage shape are integrated. Hence, the structural strength is improved, and the reliable motor can be realized.

As stated, in this embodiment, the rotor is formed by integrating the end-rings provided at both ends of the rotor in the direction toward the shaft with the conductivity material made of the aluminum material filled in the slit portion and the slot portion by die-casting aluminum. Therefore, the structural strength is improved compared with a case of fixing the end-rings and the aluminum material in the slit-slot 4 by welding, and it becomes possible to realize the reliable motor.

Since the synchronous inductance motor in this embodiment does not use a permanent magnet like the synchronous motor according to the related art, the dismantling device is not attracted by a permanent magnet. Hence, it becomes easy to dismantle the motor, and the motor which can be recycled can be realized.

In this embodiment, explanations are made on a case in which the pair of the slit portions includes four slit portions. However, it is not necessary that the slit portions are four. Further, as the conductivity material, the aluminum material was used for explanation. However, a similar effect can be realized using other materials, e.g., copper, copper alloy, brass, stainless steel material, etc. For example, when the copper is used as the material, since the copper has lower resistance rate than the aluminum material, the resistance of the secondary conductor in the squirrel-cage shape becomes lower. Hence, the characteristics on operation from starting to entering synchronization can be improved.

Since the motor has two poles in this embodiment, the rotation number can be twice the rotation number in a case of four poles. Therefore, when the motor is packaged in a compressor, the compressor with high output power can be realized. Further, since there is no slip factor, the rotation number can be increased, and the motor and the compressor with high output power can be realized compared with a case of using the inductance motor. Further, compared with the case of using the synchronous motor without the magnet, a large-scale starting device is not necessary. Hence, the motor and the compressor can be realized at the low cost. Further, compared with the case of using the synchronous motor including the magnet, the cost is low as the magnet is not necessary. Further, the dismantling device is not attracted by the magnet at a time of dismantling. Hence, the motor and the compressor which can be recycled easily can be realized.

In the synchronous inductance motor of this embodiment, time from starting to entering the synchronous rotation number can be shortened, and the performance is good. Therefore, the synchronous inductance motor with low vibrations and low noise can be realized. When this synchronous inductance motor is packaged, the compressor with low vibrations and low noise can be realized. Further, since the motor according to this embodiment and the compressor in which this motor is packaged are with low vibrations, when the motor and the compressor are applied to a freezer or an air conditioner, the reliable freezer or air conditioner in which a pipe is not cracked due to pipe vibrations can be realized. Further, since the motor according to this embodiment and the compressor in which this motor is packaged are with low vibrations and low noise, when the motor and the compressor are applied to the freezer and the air conditioner, a vibration-preventive device and a noise-preventive device are not necessary. Hence, the reliable freezer and air conditioner can be realized at the low cost.

Embodiment 2

Figure 10:
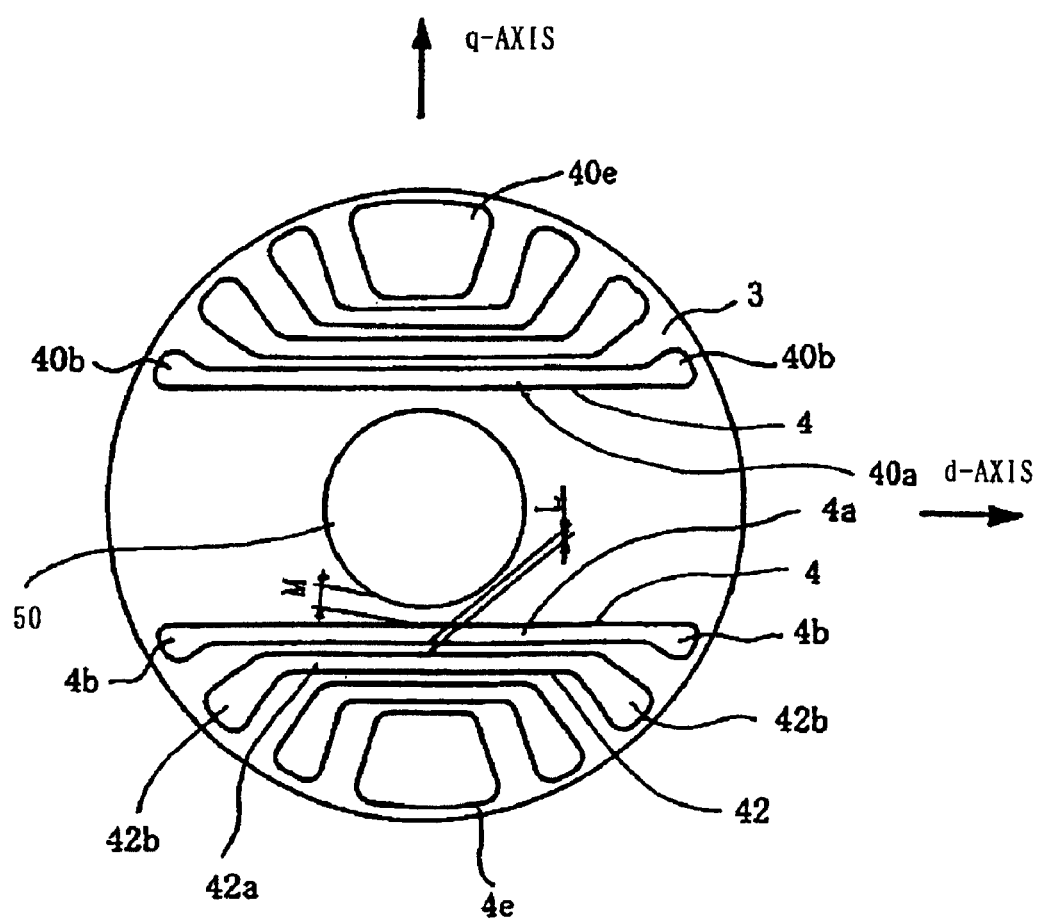
FIG. 10 shows a sectional view of the rotor in the synchronous inductance motor in Embodiment 2 of this invention.

FIG. 10 illustrates a sectional view of the rotor in the synchronous inductance motor showing Embodiment 2 of this invention. For the portions equivalent to the portions in Embodiment 1, same signs are used and explanations are omitted. In this embodiment, the non-magnetic material is used for the shaft of the rotor explained in Embodiment 1.

In FIG. 10, the rotor iron core 3 is illustrated. Electromagnetic steel plate which is the magnetic material is used for the rotor iron core 3, and the electromagnetic steel plate is layered to constitute the rotor 30 illustrated in FIG. 3. Slit-slots 4 and 42 are filled with the conductivity member made of the non-magnetic material, e.g., aluminum material, etc. Slit portions 4a and 42a and slot portions 4b and 42b are also illustrated. A width L of the rotor iron core 3 which is the magnetic material between the slit portion 4a and the slit portion 42a and a width M of the rotor iron core 3 which is the magnetic material between the shaft 50 and the slit portion 4a are illustrated. It is not necessary that the slit portions 4a and 42a are in the linear shape as explained in Embodiment 1. The slit portions 4a and 42a are in a rounded shape opened toward the direction of the d-axis to hold a shaft 50 at a center.

The non-magnetic material, e.g., aluminum material, stainless steel, etc. is used for the shaft 50. The magnetic material, e.g., iron, etc. is used for the shaft 5 of the rotor explained in Embodiment 1, and the shaft 5 is fixed to the through-hole 5a for the shaft by shrink-fitting, press-fitting, etc. Therefore, it is impossible to provide the slit portion in the shaft 5, and in a ratio between the magnetic material and the non-magnetic material measured from a direction of the q-axis, a ratio of the magnetic material is more than a ratio of the non-magnetic material by an amount of the shaft 5 which is quite large. Hence, there are cases in which the motor does not operate in an efficient condition. It is desirable that the ratio between the magnetic material and the non-magnetic material becomes a determined ratio which is efficient according to a number of poles, etc. and the ratio should be selected to reduce an input to the motor through analysis and experiment.

In this embodiment, the ratio between the magnetic material and the non-magnetic material for improving the efficiency of the motor is obtained through experiment, and it is found that the determined ratio should be magnetic material:non-magnetic material=1:1 (ratio of the magnetic material and ratio of the non-magnetic material are almost equal). Therefore, the non-magnetic material is used for the shaft 50 to increase a portion of the magnetic material in a portion besides the shaft 50 so that the ratio becomes closer to magnetic material:non-magnetic material=1:1. When the magnetic material, e.g., iron, etc. is used for the shaft 5, it is necessary that a portion of the magnetic material besides the shaft 5 is reduced and a portion of the non-magnetic material (slit portion 4) is increased so that the ratio of the magnetic material and the ratio of the non-magnetic material are almost equal.

Figure 11:
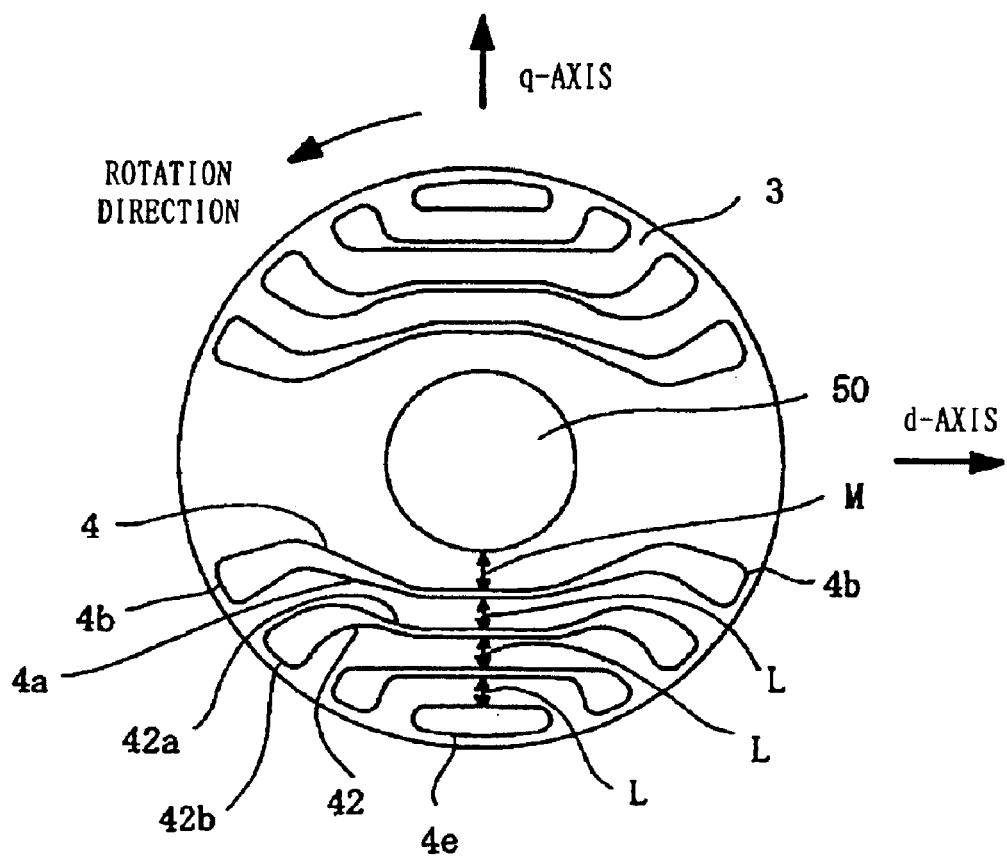
FIG. 11 shows a sectional view of the rotor for explaining widths of magnetic material and non-magnetic material.

For realizing this, it is necessary to reduce the width L and the width M as illustrated in FIG. 11. FIG. 11 shows a sectional view of the rotor for explaining widths of the magnetic material and the non-magnetic material. In FIG. 11, for the portions equivalent to the portions in Embodiment 1, same signs are used, and explanations are omitted. In FIG. 11, electromagnetic steel plate which is the magnetic material is used for the rotor iron core 3, and the electromagnetic steel plate is layered to constitute the rotor 30 illustrated in FIG. 12. The slit-slots 4 and 42 are filled with the conductivity material made of the non-magnetic material, e.g., aluminum material. The slit portions 4a and 42a and the slot portions 4b and 42b are also illustrated. The width L of the rotor iron core 3 which is the magnetic material between the slit portion 4a and the slit portion 42a and the width M of the rotor iron core 3 which is the magnetic material between the shaft 50 and the slit portion 4a are illustrated.

In FIG. 11, it is impossible to reduce the width L of the rotor iron core 3 which is the magnetic material between the slit portion 4a and the slit portion 42a and the width M of the rotor iron core 3 which is the magnetic material between the shaft 50 and the slit portion 4a to avoid deformation by punching and to maintain the strength of the rotor. Therefore, the ratio of the magnetic material is more than the ratio of the non-magnetic material in the direction of the q-axis, and there is a possibility that the motor does not operate in an efficient condition.

However, in this embodiment, the non-magnetic material, e.g., the stainless material is used for the shaft 50 as illustrated in FIG. 10. Unlike FIG. 11, the non-magnetic material is used for the shaft 50. Therefore, it is necessary to increase the ratio of the magnetic material by increasing the width L of the rotor iron core 3 which is the magnetic material between the slit portion 4a and the slit portion 42a and the width M of the rotor iron core 3 which is the magnetic material between the shaft 50 and the slit portion 4a.

Therefore, when the non-magnetic material is used for the shaft 50 as in this embodiment, the width L and the width M can be increased as illustrated in FIG. 10. Hence, the deformation of the rotor iron core 3 by punching can be prevented and the strength of the rotor 30 can be maintained. Further, since the width M which is a portion for holding the shaft can be increased, the strength in holding the shaft can be improved, and the shaft 50 does not come out from the rotor 30. Therefore, the synchronous inductance motor which is reliable and efficient can be realized.

Figure 12:
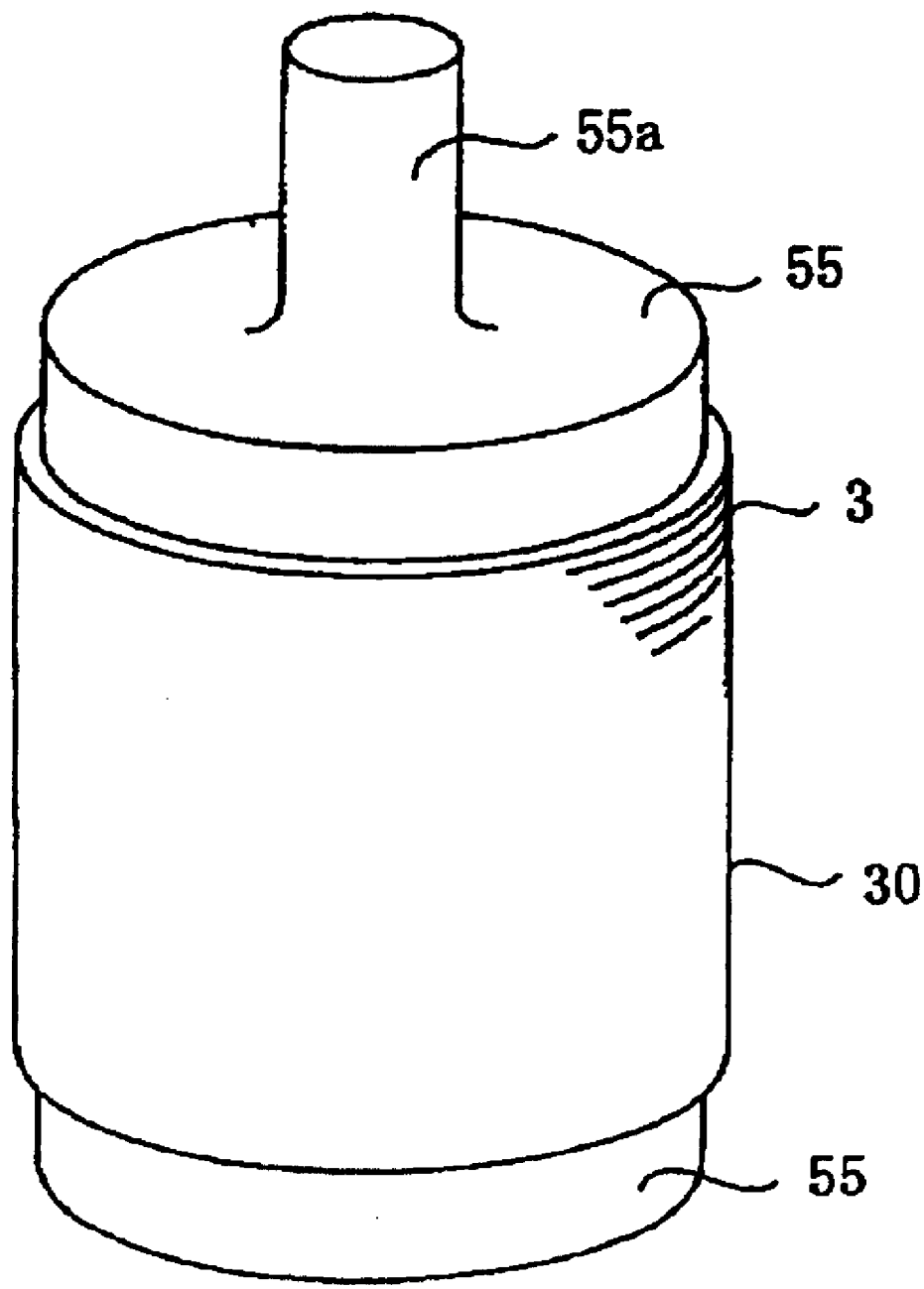
FIG. 12 shows a perspective view of the rotor in Embodiment 2 of this invention.
Figure 13:
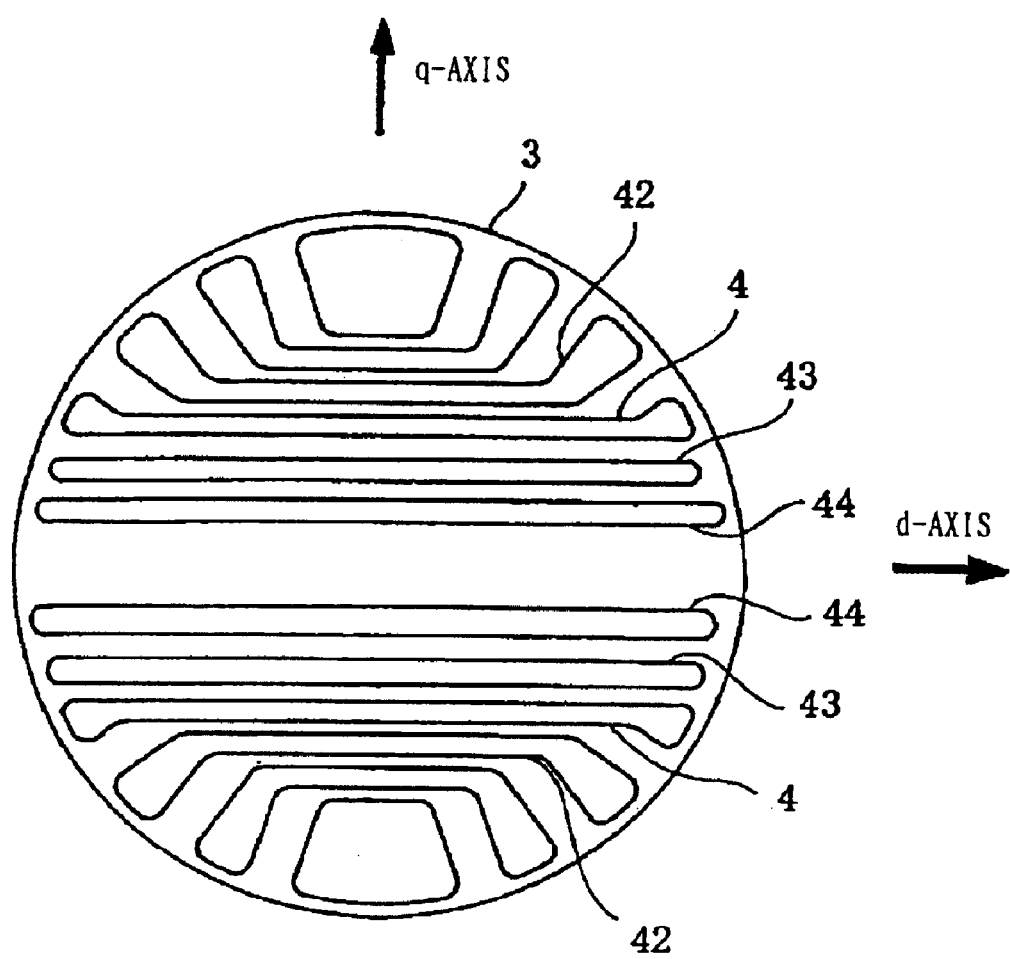
FIG. 13 shows a sectional view of the rotor in Embodiment 2 of this invention.

FIG. 12 illustrates a perspective view of the rotor in Embodiment 2 of this invention. FIG. 13 shows a sectional view of the rotor illustrating Embodiment 2 of this invention. In FIGS. 12 and 13, for the portions equivalent to the portions in Embodiment 1, same signs are used, and explanations are omitted. In FIG. 12, the rotor 30 includes the rotor iron core 3 which is layered in an axial direction. End-rings 55 are provided at both ends of the rotor iron core 3 layered, and a shaft 55a made of non-magnetic material, e.g., aluminum material is integrated with the end-rings 55 by die-casting, etc. In FIG. 13, each of the slit-slots 4, 42, 43, and 44 are pairs of slit-slots provided with respect to the d-axis. As explained in Embodiment 1, the slit-slot includes the slit portion and the slot portion, and the slit-slot is integrated with the end-rings 55 by die-casting, etc.

Since the shaft 55a made of the non-magnetic material, e.g., aluminum material, stainless material, etc. is integrated with the end-rings 55, it is not necessary to provide the shaft 55a in the rotor iron core 3. Therefore, there is no shaft in the rotor iron core 3 illustrated in FIG. 13, and the slit-slots 43 and 44 can be provided in a portion in which the shaft is provided in the related art. Hence, the ratio between the magnetic material and the non-magnetic material in the direction of the q-axis can be set at a determined ratio (it is desired that the ratio of the magnetic material and the ratio of the non-magnetic material are equal).

Specifically, the width of the slit-slots 4, 42, 43, 44, and 4e which are portions made of the non-magnetic material and the width of the slit-slots (4, 42, 43, 44, and 4e) of the rotor iron core 3 which are portions made of the magnetic material in the direction of the q-axis can be set equal for obtaining the determined ratio of 1:1. At this time, by setting the widths between the slit-slots (4, 42, 43, 44, and 4e) of the rotor iron core 3 to prevent the deformation at a time of punching and maintain the strength of the rotor, it is possible to maintain the reliability, and the efficient synchronous inductance motor can be realized.

As stated, by using the non-magnetic material for the shaft 55a and integrating the shaft 55a with the end-rings 55 by die-casting, etc., it becomes unnecessary to provide the shaft 55a in the rotor iron core 3, and the slit-slots (43, 44) can be provided in a portion where the shaft is provided in the related art. Hence, the ratio of the magnetic material and the ratio of the non-magnetic material in the direction of the q-axis, i.e., the difficult-to-pass direction of the magnetic flux, can be set at the determined ratio, and the efficient motor can be realized. Further, since it is not necessary to provide the shaft 55a in the rotor iron core 3, the slit-slot (43, 44) can be provided in the portion where the shaft is provided in the related art. Hence, the width between the slit-slots can be set flexibly to obtain the strength, and the reliable synchronous inductance motor can be realized.

Embodiment 3

Figure 14:
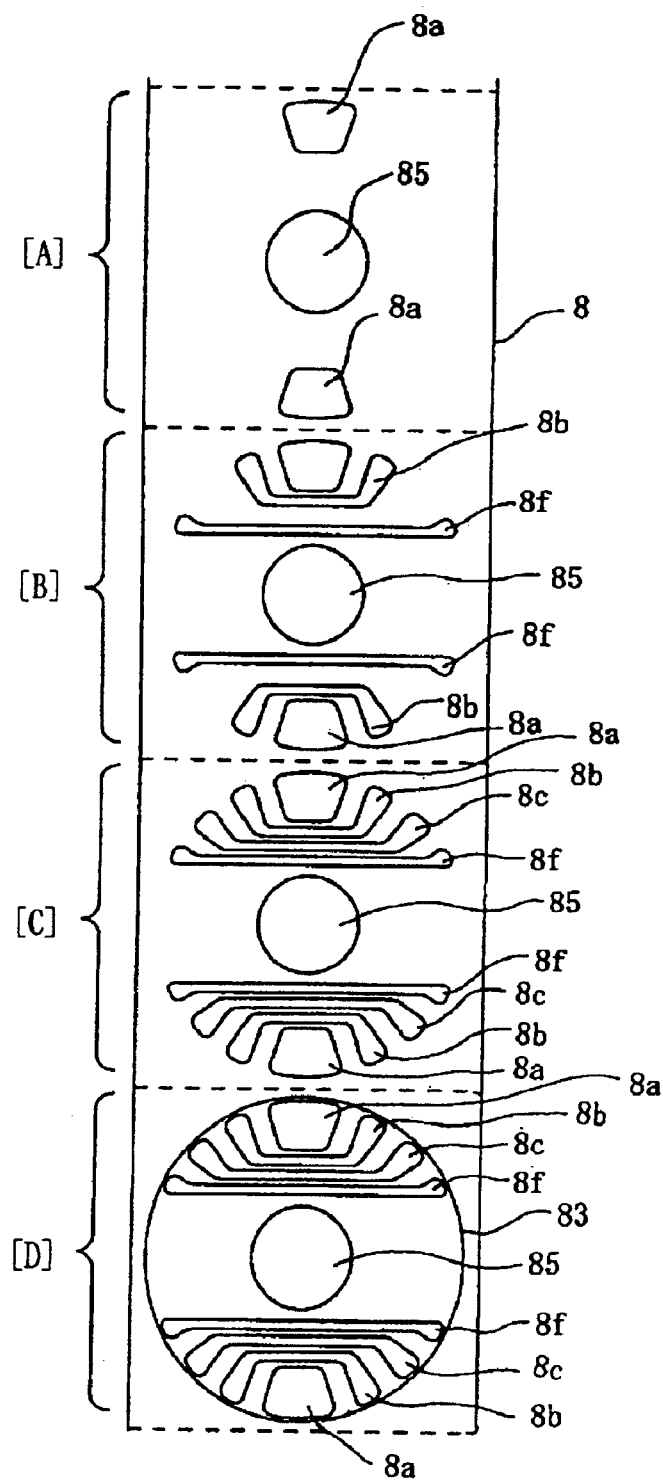
FIG. 14 illustrates a manufacturing process of the rotor in Embodiment 3 of this invention.

With reference to drawings, Embodiment 3 of this invention is explained. FIG. 14 illustrates manufacturing of the rotor of the synchronous inductance motor in Embodiment 3 of this invention. In FIG. 14, for punching the electromagnetic steel plate in a shape of the rotor by a die for punching which is a mechanism for punching, when two or more slit-slots are adjacent, the slit-slots are punched a few times so that adjacent slit-slots are not punched at once. Accordingly, the rotor iron core is punched accurately. In this embodiment, the rotor iron core 3 in the shape illustrated in FIG. 7 explained in Embodiment 1 is punched consecutively.

In FIG. 14, an electromagnetic steel plate 8 is put through the die for punching (not illustrated) which is the mechanism for punching consecutively. FIG. 14 shows the rotor iron core 3 punched by the mechanism for punching consecutively. In FIG. 14, slit-slots 8a, 8b, 8c, and 8f include the slit portions for generating reluctance torque and the slot portions for generating inductance torque, and the slit-slots are placed adjacently in a horizontal direction toward the direction of the d-axis. A through-hole 85 for a shaft and an outer circumference 83 of the rotor iron core 3 are illustrated.

As illustrated in FIG. 14, in [A], the through-hole 85 for the shaft is punched by a mechanism for punching a through-hole for a shaft, and the slit-slot 8a which is closest to the outer circumference is punched by a mechanism for punching a slit-slot which is closest to the outer circumference. In this operation, the through-hole 85 for the shaft and the slit-slot 8a which is closest to the outer circumference can be punched separately. However, time for operation can be reduced by punching them at once.

In [B], among three adjacent slit-slots, i.e., slit-slots 8b, 8c, and 8f, the slit-slot 8b and the slit-slot 8f except the slit-slot 8c are punched together by a mechanism for punching non-adjacent slit-slots so that the adjacent slit-slots are not punched together. It is not necessary to punch the slit-slot 8b and the slit-slot 8f together. The slit-slot 8b and the slit-slot 8f can be punched separately.

Then, in [C], the slit-slot 8c between the slit-slot 8b and the slit-slot 8f, which is adjacent to the slit-slot 8b and the slit-slot 8f is punched by the mechanism for punching adjacent slit-slots. Then, in [D], the outer circumference 83 of the rotor iron core 3 is punched by a mechanism for punching the outer circumference of the rotor iron core, and the rotor iron core 3 is completed. Then, after a plurality of rotor iron cores 3 is layered, a plurality of slit-slots and end-rings provided at both ends of the rotor iron core layered are integrated by die-casting the non-magnetic material, e.g., the aluminum material, and the rotor 30 is completed.

For punching the rotor iron core 3, when a plurality of adjacent slit-slots including a linear portion in the direction of the q-axis are adjacent (the slit-slots 8b, 8c, and 8f are adjacent in a horizontal direction (direction of the d-axis), stress is concentrated in a narrow part of the rotor iron core 3 (electromagnetic steel plate) between the slit-slots in punching together. Hence, the strength weakens, and the accuracy in punching the rotor iron core 3 drops. In this embodiment, the adjacent slit-slots (the slit-slots 8b, 8c, and 8f are adjacent) are not punched together. Since the slit-slot 8c between the slit-slot 8b and the slit-slot 8f, which is adjacent to the slit-slot 8b and the slit-slot 8f is punched after the slit-slot 8b and the slit-slot 8f are punched, the stress is not concentrated in the narrow part between the slit-slots, which is created after punching. Therefore, the accuracy in punching the rotor iron core 3 does not drop, and the strength of the rotor iron core is maintained.

Specifically, when the rotor includes the plurality of slit-slots, the narrow part between the slit-slots is created by punching the adjacent slit-slots together. The stress is concentrated in the narrow part, and there is a possibility that a sectional form of the slit portion is deformed and bent almost in a V shape. When the rotor iron core 3 is layered while the sectional form of the narrow part is deformed, a gap is created in an axial direction in the deformed portion in layering.

When the slit-slot is filled with the aluminum material by die-casting the aluminum in the state with the gap created, there is a possibility that the aluminum material leaks from the gap in the axial direction to a portion between the rotor iron cores 3 layered, and a bridge is created. When the motor is operated using the rotor to which the bridge is created, unnecessary current flows into the bridge, and the characteristics as the inductance motor deteriorates. Therefore, there is a possibility that the vibrations and the noise are caused by the torque during asynchronous operation.

However, in this embodiment, when the rotor iron core is punched using a mechanism for punching, i.e., the die for punching, the slit-slot is punched in a few times so that the adjacent slit-slots are not punched together and the stress is not concentrated in the narrow part between the adjacent slit-slots. Therefore, it is possible to minimize the deformation of the sectional shape of the slit-slot. Hence, even when the slit-slot is filled with the aluminum material by die-casting aluminum, the aluminum material does not leak, and the bridge is not created. Accordingly, the unnecessary current does not flow into the bridge, and the characteristics as the inductance motor does not deteriorate. Further, it is possible to suppress generation of the vibrations and the noise caused by the torque during asynchronous operation.

As stated, in this embodiment, the slit-slot 8b and the slit-slot 8f except the slit-slot 8c are punched together by the mechanism for punching the non-adjacent slit-slots so that the adjacent slit-slots are not punched together. After the slit-slot 8c between the slit-slot 8b and the slit-slot 8f, which is adjacent to the slit-slot 8b and the slit-slot 8f is punched by the mechanism for punching the adjacent slit-slots. Therefore, the stress is not concentrated in the narrow part of the electromagnetic steel plate, created in the direction of the q-axis between the slit-slots in simple equipment. Hence, a reliable synchronous inductance motor without deformation of the rotor iron core, etc. and an apparatus for manufacturing the synchronous inductance motor can be realized.

Since the creation of the bridge can be suppressed, the unnecessary current does not flow into the bridge, and the characteristics as the inductance motor does not deteriorate. Further, since it is possible to suppress generation of the vibrations and the noise caused by the torque during the asynchronous operation, the efficient synchronous inductance motor with the low vibrations and low noise and the apparatus for manufacturing the synchronous inductance motor can be realized. Further, the reliable rotor of which rotor iron core is punched accurately and of which strength can be maintained can be realized.

Figure 15:
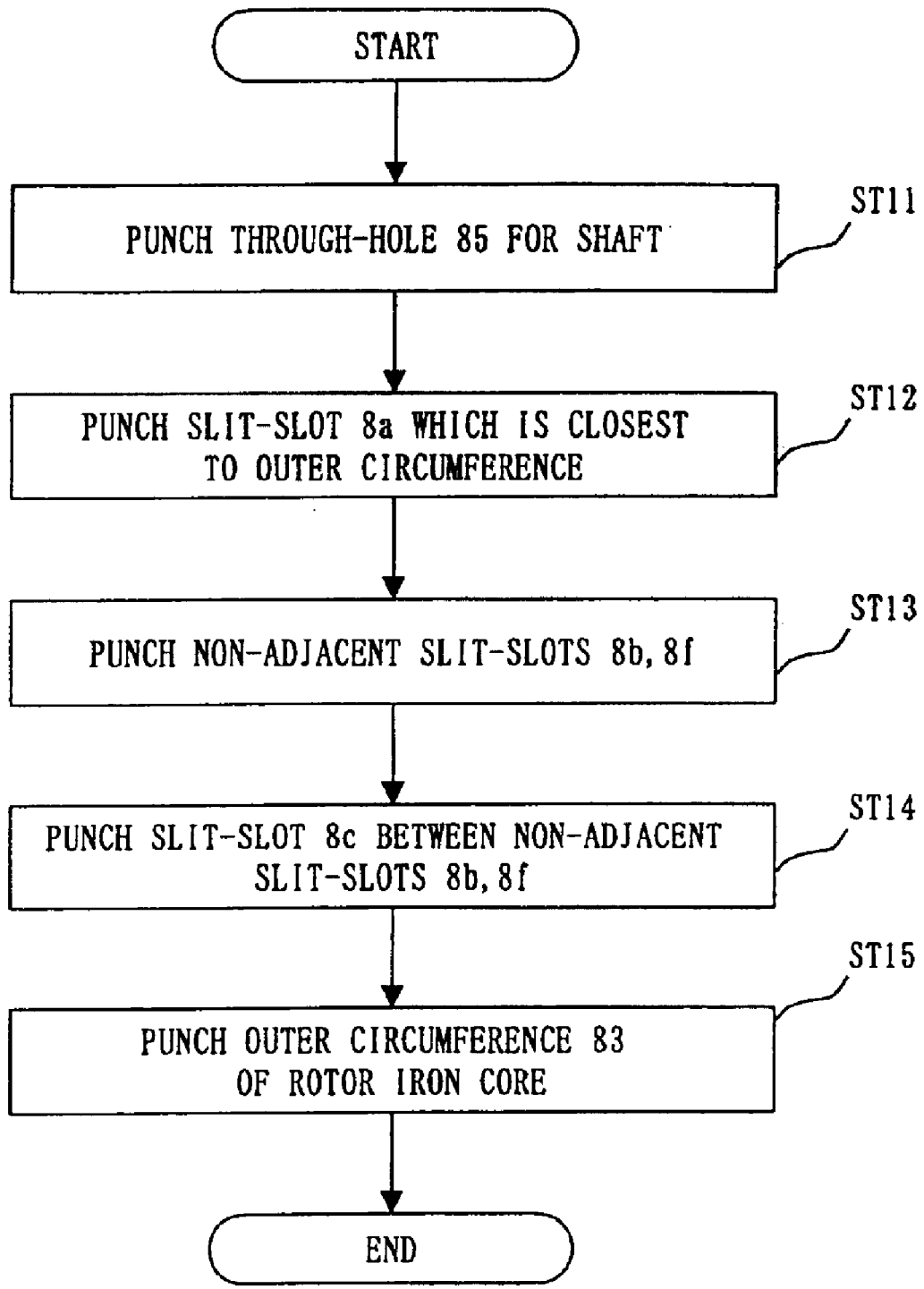
FIG. 15 shows a flow chart of manufacturing a rotor iron core in Embodiment 3 of this invention.
Figure 16:
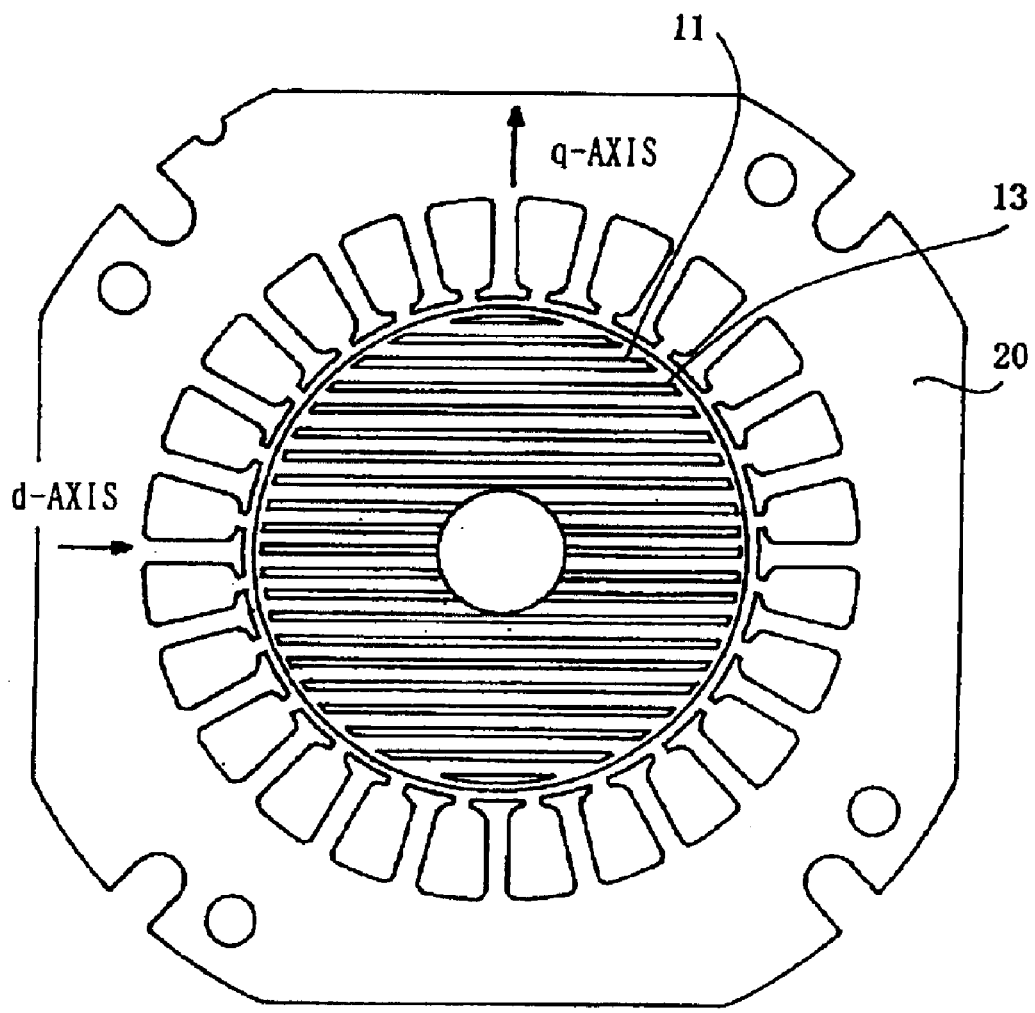
FIG. 16 shows a sectional view of the motor according to the related art.
Figure 17:
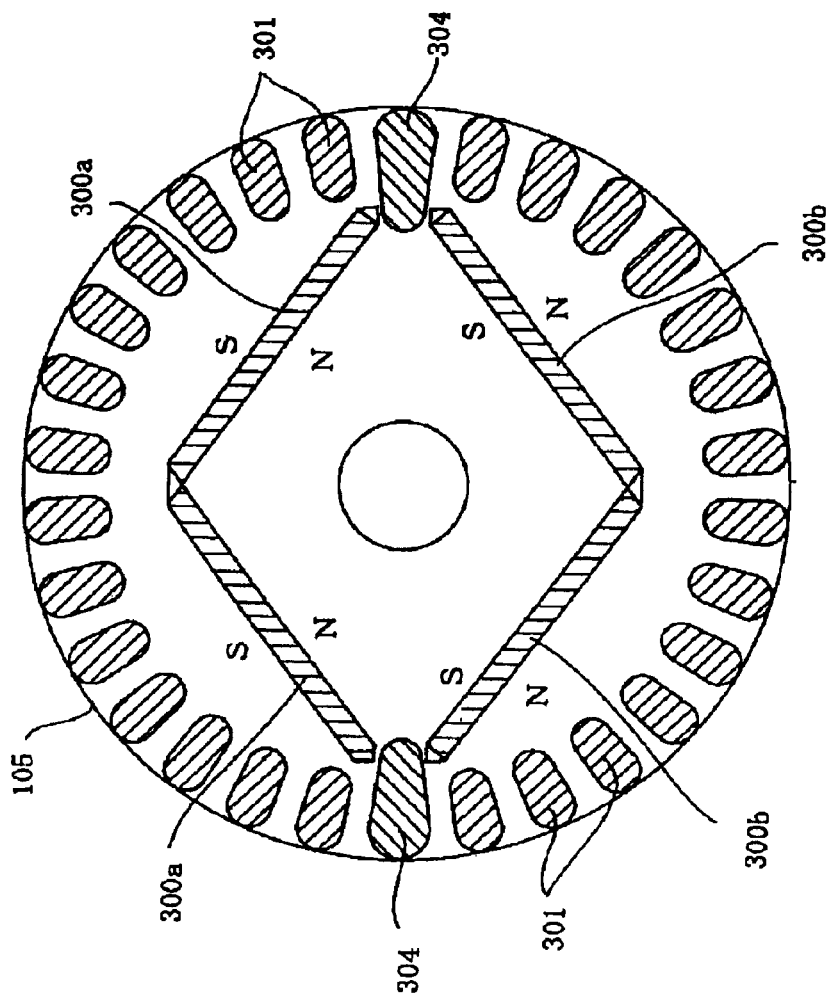
FIG. 17 shows a sectional view of the rotor of the synchronous motor according to the related art.

Next, with reference to a flow chart, an operation of this embodiment is explained. FIG. 15 shows a flow chart for manufacturing the rotor iron core in Embodiment 3 of this invention. In FIG. 15, step ST11 for punching the through-hole for the shaft, and step ST12 for punching the slit-slot which is closest to the outer circumference are illustrated. In step ST13 for punching the non-adjacent slip-slots, one of the adjacent slip-slots is punched so that the adjacent slip-slots are not punched together. In step ST14 for punching the adjacent slit-slots, the slit-slot 8c between the slit-slot 8b and the slit-slot 8f, which is adjacent to the slit-slot 8b and the slit-slot 8f is punched. Step ST15 for punching an outer circumference of the rotor iron core is also illustrated.

Steps ST11 and ST12 correspond to [A] in FIG. 14, and step ST13 corresponds to [B] in FIG. 14. Step ST14 corresponds to [C] in FIG. 14, and step ST15 corresponds to [D] in FIG. 14.

In step ST11, the through-hole 85 for the shaft is punched for inserting the shaft 5. Then, in step ST12, the pair of slit-slots 8a which is closest to the outer circumference is punched. In this operation, the slit-slots 8a and the through-hole 85 can be punched at once or separately. In step ST13, among three adjacent slit-slots, i.e., slit-slots 8b, 8c, and 8f, the pair of slit-slots 8b and the pair of slit-slots 8f except the slit-slots 8c are punched together so that the adjacent slit-slots are not punched together. When there are two adjacent slit-slots, two slit-slots are not punched together, and one of the slit-slots is punched.

In step ST14, the slit-slots 8c between the slit-slots 8b and the slit-slots 8f punched in step ST13 is punched. As stated, in this embodiment, when there are three adjacent slit-slots, i.e., slit-slots 8b, 8c, and 8f, after the slit-slots 8b and 8f in both ends except the slit-slot 8c are punched, the slit-slots 8c in the middle are punched. Hence, the adjacent slit-slots are not punched together. Even when there are two adjacent slit-slots or four or more adjacent slit-slots, it is sufficient if an order of punching is considered so that the adjacent slit-slots are not punched together.

Finally, in step ST15, the outer circumference 83 of the rotor iron core 3 is punched, and a plate of the rotor iron core 3 is completed. By repeating these steps sequentially, a plurality of plates of the rotor iron core 3 can be obtained. Further, by layering the plurality of plates and integrating the slit-slot and the end-rings provided at both ends in the axial direction by die-casting the non-magnetic material, e.g., aluminum material, etc., the rotor 30 can be obtained.

As stated, in this embodiment, in step for punching the non-adjacent slit-slots, one of adjacent slip-slots is punched so that the adjacent slip-slots are not punched together, and in step for punching the adjacent slit-slots, the slit-slot adjacent to the slit-slot punched in the step for punching the non-adjacent step is punched. Therefore, the stress is not concentrated in the narrow part between the slit-slots of the rotor iron core 3, which is created in the direction of the q-axis only by a simple control of changing the order of punching the slit-slots. Hence, a manufacturing method of a reliable synchronous inductance motor without deformation of the rotor iron core, etc. can be realized at a low cost.

In this embodiment, a configuration for punching the rotor iron core 3 by the die for punching which is the mechanism for punching. However, it is also possible that the stator iron core outside of the rotor iron core is punched together. By doing so, the stator iron core and the rotor iron core can be punched at once. Therefore, the time for punching can be reduced, and equipment for punching can be simplified. Further, the cost can be reduced.

A synchronous inductance motor according to an embodiment of this invention has a slit-slot including at least a pair of slit portions provided in a rotor, for forming two-pole magnetic polar projection having an easy-to-pass direction of the magnetic flux, i.e., d-axis and a difficult-to-pass direction of the magnetic flux, i.e., q-axis which are almost orthogonal, and a plurality of slot portions arranged close to an outer circumference in the slit portions and connected to at least an end of the slit portions in a direction of the d-axis, for generating induction torque. Further, an inside of the slit-slot is filled with conductivity material. Therefore, a special starting device is not necessary for starting, and the synchronous motor can be realized at a low cost.

In the synchronous inductance motor according to an embodiment of this invention, the slit portions are almost in a linear shape. Therefore, the magnetic flux comes to pass easily, and an efficient motor can be realized.

In the synchronous inductance motor according to an embodiment of this invention, the slit portions are arranged almost parallel to the d-axis. Therefore, the magnetic flux comes to pass easily, and a rise in temperature of the motor can be suppressed. Hence, the reliable motor without an incidence like burning the coil, etc. can be realized.

In the synchronous inductance motor according to an embodiment of this invention, a rotor in which the slot portions are provided in a rotation direction with an almost equal interval. Therefore, the inductance torque can be increased. Further, the motor can be started stably to reach synchronous operation, and the reliable synchronous inductance motor can be realized.

In the synchronous inductance motor according to an embodiment of this invention, the slit portions and the slot portions are separated. Therefore, respective members for filling can be filled in the slit portion and the slot portion. Hence, the member for filling can be selected more flexibly, and the cost can be reduced. Further, it is possible to increase flexibility in characteristics of the motor.

The synchronous inductance motor according to an embodiment of this invention includes the rotor formed by integrating end-rings provided at both ends of the rotor in an axial direction and the conductivity material filled in the slit portions and the slot portions by die-casting. Therefore, the structural strength is improved. Hence, the reliable motor can be realized.

The synchronous inductance motor according to an embodiment of this invention includes a shaft provided in the rotor, for transferring rotation power of the rotor, and the shaft is made of non-magnetic material. Therefore, the deformation of the rotor iron core by punching can be prevented and the strength of the rotor can be maintained. Further, since the width which is a portion for holding the shaft can be increased, the strength in holding the shaft can be improved, and the shaft does not come out from the rotor during operation. Therefore, the synchronous inductance motor which is reliable and efficient can be realized.

The synchronous inductance motor according to an embodiment of this invention includes end-rings made of the non-magnetic material, provided at both ends of the rotor in an axial direction, and the shaft is integrated with the end-rings. Therefore, the ratio of the magnetic material and the ratio of the non-magnetic material in the direction of the q-axis, i.e., the difficult-to-pass direction of the magnetic flux, can be set at the determined ratio, and the efficient motor can be realized.

A compressor includes a synchronous inductance motor according to an embodiment of this invention. Therefore, a large-scale starting device is not necessary. Further, time from starting to entering the synchronous rotation number can be shortened, and the performance is good. Hence, the compressor with low vibrations and low noise can be realized.

In a manufacturing method of a synchronous inductance motor, according to an embodiment of this invention, a rotor iron core is punched in non-adjacent slit-slot punching for punching non-adjacent slit-slots among a plurality of slit-slots including a slot portion for generating inductance torque and a slit portion for generating reluctance torque connected each other, adjacent slit-slot punching for punching a slit-slot existing between the non-adjacent slit-slots punched in the non-adjacent slit-slot punching, and rotor outer circumference punching for punching an outer circumference of the rotor iron core. Therefore, the stress is not concentrated in the narrow part between the slit-slots of the rotor iron core, which is created in the direction of the q-axis only by a simple control of changing the order of punching the slit-slots. Hence, a manufacturing method of a reliable synchronous inductance motor without deformation of the rotor iron core, etc. can be realized at a low cost.

Having thus described several particular embodiments of the invention, various alterations, modifications, and improvements will readily occur to those skilled in the art. Such alterations, modifications, and improvements are intended to be portion of this disclosure, and are intended to be within the spirit and scope of the invention. Accordingly, the foregoing description is by way of example only and is limited only as defined in the following claims and the equivalents thereto.

What is claimed is:

1. A synchronous inductance motor comprising:
    at least a pair of continuous slit portions provided in a rotor, the slit portions being substantially of a linear shape and configured to form two-pole magnetic polar projection having an easy-to-pass direction of the magnetic flux, i.e., d-axis, and a difficult-to-pass direction of the magnetic flux, i.e, q-axis, said axes being substantially orthogonal to each other; and
    a plurality of slot portions arranged close to an outer circumference in the slit portions and connected to at least an end of the slit portions in a direction of the d-axis, the slot portions being configured to generate an induction torque, wherein the slit portions and the slot portion are filled with conductivity material.

2. The synchronous inductance motor of claim 1, wherein the slit portions are substantially parallel to the d-axis.

3. The synchronous inductance motor of claim 1, wherein the slot portions are separated radially with a substantially equal interval.

4. The synchronous inductance motor of claim 1, wherein the slit portions and the slot portions are separated.

5. The synchronous inductance motor of claim 1, wherein end-rings provided at both ends of the rotor in an axial direction and the conductivity material filled in the slit portions and the slot portions are integrated by die-casting.

6. The synchronous inductance motor of claim 1 comprising a shaft provided in the rotor, for transferring rotation power of the rotor, wherein the shaft is made of non-magnetic material.

7. The synchronous inductance motor of claim 6 comprising end-rings made of the non-magnetic material, provided at both ends of the rotor in an axial direction, wherein the shaft is integrated with the end-rings.

8. A compressor comprising the synchronous inductance motor of claim 1.

* * * * *